(No Model.)
T. HARRIS.
ELECTRIC RAILWAY SYSTEM.
No. 493,623. Patented Mar. 14, 1893.
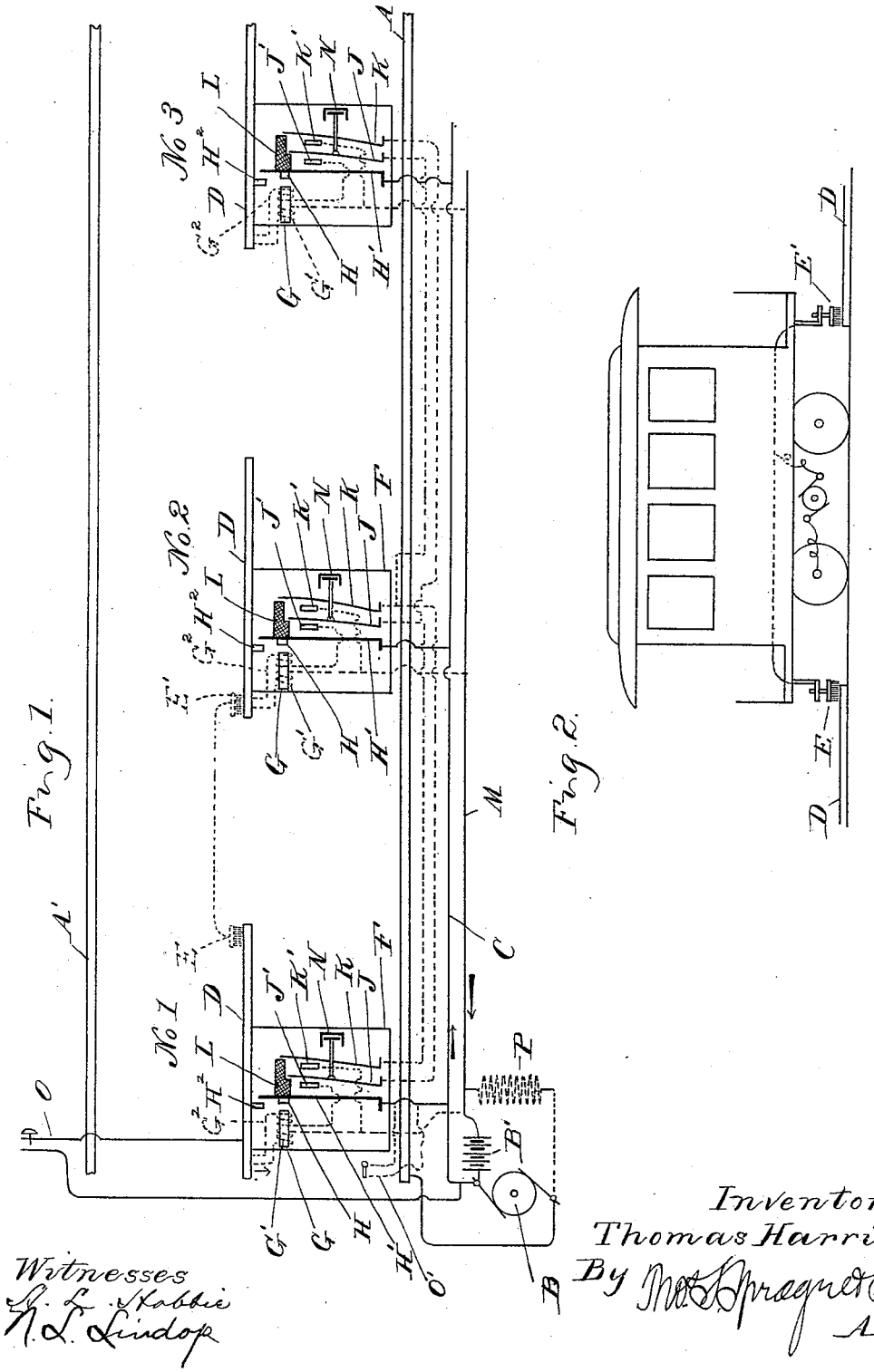
Witnesses
Inventor
Thomas Harris

UNITED STATES PATENT OFFICE.

THOMAS HARRIS, OF DETROIT, MICHIGAN, ASSIGNOR, BY MESNE ASSIGNMENTS, TO THE HARRIS ELECTRICAL PROPULSION COMPANY, LIMITED, OF SAME PLACE.

ELECTRIC-RAILWAY SYSTEM.

SPECIFICATION forming part of Letters Patent No. 493,623, dated March 14, 1893.

Application filed January 8, 1892. Serial No. 417,347. (No model.)

*To all whom it may concern:*

Be it known that I, THOMAS HARRIS, a subject of the Queen of Great Britain, residing at Detroit, in the county of Wayne and State of Michigan, have invented certain new and useful Improvements in Electric-Railway Systems, of which the following is a specification, reference being had therein to the accompanying drawings.

This invention relates to new and useful improvements in electric railway systems, of which the following is a specification.

My invention relates to that system of electric propulsion wherein a car is provided with an electric motor receiving a current through a traveling contact from an exposed and discontinuous working conductor, the sections of which are connected successively by automatic switching devices with the main conductor or power line, the arrangement being such that the sections of the working conductor are connected with the power line only during the time a car is passing over it.

The present invention relates to improvements in the arrangement of the working conductor and of the switching devices, whereby a more simple and economical construction and operation are obtained, all as more fully hereinafter described and specifically set forth in the claims.

In the accompanying drawings, Figure 1 is a diagram plan of a section of road embodying the invention, and Fig. 2 shows in diagram, a car connecting two adjacent sections of the working conductor.

A A' are the two track rails upon which the car travels, one of the rails A serving as a return conductor for the generator B.

C is the main conductor or so-called power line, this is preferably placed underground in a conduit or pipe and suitably insulated.

D D represent the sections of a discontinuous working circuit extending the length of the track; the sections are insulated from each other and are exposed and adapted to form electric contact with a pair of brushes E E' or other suitable contact devices carried on the car. The brushes E E' are preferably placed at or near the ends of the car respectively, and the distance between the ends of two adjoining sections of the working conductor is less than the distance between the brushes so that in the travel of the car the front brush will contact with a new section before the rear brush has parted contact with the section just passed over. The brushes E E' are in electrical contact with each other, and, as usual, conduct the current from the working conductor to the motor from which it passes by way of the axle and wheels to the return conductor A, the motor being thus in multiple between the power conductor and the return rail. Each section of the working conductor is normally disconnected from the power line, and is provided with a switching device for connecting it with the main conductor or power line, during the time a car is passing over it. These switching devices are preferably inclosed in switch boxes F, accessibly located either in the ground in proximity to the sections D, singly or in groups, or the switching devices may be accessibly located above ground near side-walks or buildings.

The construction of each switch is as follows: G is an electro-magnet, H is its armature; H' is a contact arm or spring which carries the armature. H² is a fixed contact with which the free end of the arm H is adapted to contact. J is a second contact arm or spring, and J' is its fixed contact. K is a third contact arm or spring and K' is its fixed contact. The spring arm H' is connected to the power line C and forms a normally open contact with the working conductor D, such contact being closed by the attraction of the armature H when the magnet G is energized. The spring arms J and K are adapted to close against the fixed contacts J' and K', by their own resiliency, but they are normally held open by the superior force of the contact arm H', which bears against them through the medium of a suitable insulating block or blocks L.

The switches are operated by a current from an auxiliary battery or generator B', which generator need only produce a sufficient current to operate the switching devices. A main conductor M extends from this generator the whole length of the working conductor, and is preferably included in the same conduit with the power line C which forms the other main conductor of the auxiliary generator. Each electro-magnet is provided with two helices G', $G^2$ which are wound in opposite directions, the helix G' has one terminal connected to the section D, and the other terminal to the switch conductor M, and to the contact K'; the other helix $G^2$ has one terminal also connected to the section D of the working conductor, and the other to the contact J'.

The spring arms J and K of the switch boxes are connected with each other in alternating order, that is, the arm J is connected to the arm K in the next box, and the arm K to the arm J, and so on; and a dash pot N, or other means is provided for the springs J, to retard them so that the arms K will close with their contacts first, when the armature H is attracted. The first and last sections of the working conductor are provided with a manual switch or push O, by means of which they may be temporarily connected with the power line C.

In practice the parts being arranged and constructed substantially as shown and described, they are intended to operate as follows: In starting a car over the road from the first section D on the left hand side in Fig. 1, the operator temporarily closes the switch O. This sends the current of the auxiliary generator through the helix G' of the electro-magnet switch box No. 1, energizing the magnet G and attracting the armature H, thereby connecting the section D to the power line and enabling the motor to take its current from the working conductor. It will be seen that as soon as the armature is attracted, the current from the auxiliary generator passes by way of the arm H', section D, helix G' to the conductor M, and thereby holds the armature attracted after the push button or manual switch O is opened again. As soon as the car leaves the first section D, and while the brush E is still in contact with said section, the brush E' makes electrical contact with the next section D and a new path is provided for the current of the auxiliary generator by way of the two brushes from the first section D through the helix G' in No. 2 switch box. This attracts the armature and connects the second section D of the working conductor in the same manner as before with the power line, and at the same time the arm K in making contact with K' (which being the first contact to close as the other contact arm J is delayed) closes a circuit through the helix $G^2$ in No. 1 switch box, by way of the contact J', and contact arm J in said switch box, and contact arm K and contact K' in the switch box No. 2, through which circuit the auxiliary generator current passes, and as the helices G' $G^2$ are wound in opposite directions, they will neutralize each other, and all the contact arms in No. 1 box will move back to their normal position, thus cutting out the first section D of the working conductor. This operation is repeated from section to section until the car arrives on the last section which remains active. The car if now started in the opposite direction operates the switching devices in the same manner as when going in the opposite direction, that is, each section of the working conductor is connected to the power line the instant the foremost brush on the car touches it and it remains connected until the next section ahead of it is connected, when it will be disconnected by the neutralization of its magnet. When the car has returned again to the rail D on No. 1, switch box, all the sections are disconnected except this one on which the car stands. Thus the push or manual switch need be used only for the initial starting of the car. If, however, it should be desired to also cut out the end sections on which the car stands, it could be readily done by a manual switch in the connection of the spring arm H', with the power line as shown in dotted lines at O' on No. 1 switch box, so that by opening this switch the section is disconnected from the power line. The gaps between the ends of the sections may be made larger or smaller as desired, with the brushes on the car correspondingly far enough apart to just span the gap; if the sections approach each other closely, a single brush on the car may be used, which, however must be adapted to lap the adjoining ends of two sections. It will be understood, that by making the gaps between the sections as large as possible, the construction has the advantage of greater economy and safety.

The auxiliary generator may be either a galvanic battery or a small dynamo, as shown at B' or this auxiliary generator may be omitted and the switch line is then connected to the other pole of the power dynamo with a resistance P interposed as clearly shown in dotted lines in the drawing. The switch circuit is thus provided with a derived current instead of having an independent source.

It is obvious that the switch line and the different switch wires may be inclosed in one conduit with the power line where it may be found convenient.

The two helices on the switch actuating magnets are both in circuits connecting the section of the working conductor to which the switch magnet belongs with the switch line; one of these helices has its circuit permanently closed and serves primarily to connect the working conductor with the power line by energizing the magnet to attract the armature; the circuit of the other helix connects to the switch line through two branches and includes three normally open breaks; one in the circuit between the helix and the branches, and the others located respectively in the two branches. The first mentioned break is controlled by the armature of the magnet upon which the helix is wound, the other two breaks are controlled by the armature magnets of the two adjacent sections of the working conductor, and the closing of only one of these is required in connection with the closing of the break controlled by the armature of the magnet of the helix itself, to close the circuit through the helix. The object of the two branches is simply to make the device operate with the car going in either direction.

What I claim as my invention is—

1. The combination of a working conductor composed of disconnected sections, a contact or contacts on the car to electrically connect the ends of adjoining sections, a continuous power line normally disconnected from the sections, a switch line forming in connection with said power line a switch actuating circuit, an electro-magnet for each section of the working conductor the armature of which connects the power line with the section and two oppositely wound helices upon said magnets, each in a circuit connecting its section of the working conductor with the switch line, the circuit of one of the helices containing two normally open breaks, one controlled by the armature of the magnet of the helix, and the other by the armature of the magnet of an adjacent section of the working conductor.

2. The combination of a working conductor composed of disconnected sections, a contact on the car to electrically connect the ends of adjoining sections and to connect the sections to the motor circuit, a continuous power line normally disconnected from the sections, a switch line forming in connection with the power line a switch actuating circuit, an electro-magnet for each section of the working conductor, the armature of which connects the same with the power line, and two opposing helices on said magnets, one in a permanently closed and the other in a normally open circuit connecting the section with the switch line, the latter circuit having two breaks, one controlled by the armature of the magnet of the helix and provided with a relay and the other by the magnet of an adjacent section of the working conductor, substantially as described.

3. The combination of a working conductor composed of disconnected sections, a contact on the car to electrically connect adjacent sections in the travel of the car, a continuous power line, a switch line forming in connection with said power line, a switch circuit, an electro-magnet for each section of the working conductor, the armature of which connects the same with the power line, two opposing helices on said magnets one in a permanently closed circuit connecting the section with the switch line and the other in a normally open circuit connecting the section with the switch line through two branches, and three breaks in said circuit, one controlled by the magnet of the helix and the other two located in the branches of the circuit and controlled respectively by the armatures of the magnets of the two adjacent sections of the working conductor.

4. The combination of a continuous power line, a discontinuous working conductor, a contact on the car to connect the ends of adjacent sections of said working conductor, a switch line forming in connection with the power line a switch circuit and switching devices connected to the sections of the working conductor and operated by said switch circuit, said switching devices comprising an electro-magnet with two opposing helices one to close the contacts controlled by the armature of the magnet, and the other to open said contacts again by neutralizing the magnet when the car has passed to the adjacent section of the working conductor, substantially as described.

5. The combination of a continuous power line, a discontinuous working conductor, a contact on the car to connect the ends of adjacent sections of said working conductor, a switch line forming in connection with the power line a switch circuit (and having an independent source of electricity) and switching devices connected to the sections of the working conductor and operated by said switch circuit, said switching devices comprising an electro-magnet with two opposing helices one to close the contacts controlled by the armature of the magnet, and the other to open said contacts again by neutralizing the magnet when the car has passed to the adjacent section of the working conductor, substantially as described.

6. The combination of an insulated power line, a switch line forming in connection with said power line a derived or independent switch circuit extending along the track, a sectional working conductor having each of its sections in multiple connection between said power line and switch line, a switch magnet in each of said connections having its actuating helix located between the section of the working conductor, and the switch line, an armature for each magnet located in said connection between the section of the working conductor and the power line to connect and disconnect said power line from the section of the working conductor and a motor car carrying a contact adapted to connect the motor circuit with the sections of the working conductor and to electrically connect the ends of adjacent sections thereof, substantially as described.

7. The combination of an insulated power line, a switch line forming in connection with said power line a derived or independent switch circuit extending along the track, a working conductor composed of widely separated insulated sections each connected in multiple between said power line, and switch line, a switch magnet in each of said connections having its actuating helix located between the working conductor and the switch line and its armature between the working conductor and the power-line to connect said power line with the working conductor and through the working conductor and helix with the switch line, and a motor car carrying two contacts electrically connected with each other and adapted to connect the motor circuit with the working conductor and to electrically connect the ends of adjacent sections, substantially as described.

8. The combination of an insulated continuous power line, an insulated switch line forming in connection with said power line a derived or independent switch circuit extending along the track, a discontinuous working conductor the sections of which are in normally open multiple connection between the power line and switch line, a switch magnet in each of said connections having its actuating helix located between the working conductor and the switch line, and its armature located between the working conductor and the power line to connect said power line to the working conductor and through said working conductor and helix to the switch line, a motor car carrying a contact or contacts to connect the motor circuit with the working conductor and to electrically connect the ends of adjacent sections of the working conductor, and a manual switch or push to electrically connect the initial section of the working conductor into the switch circuit, substantially as described.

In testimony whereof I affix my signature in presence of two witnesses.

THOMAS HARRIS.

Witnesses:
 JAMES WHITTEMORE,
 M. B. O'DOGHERTY.